(12) United States Patent
Sawai et al.

(10) Patent No.: US 10,124,858 B2
(45) Date of Patent: Nov. 13, 2018

(54) SNOWMOBILE

(71) Applicant: Yamaha Hatsudoki Kabushiki Kaisha, Shizuoka-ken (JP)

(72) Inventors: Seiji Sawai, Shizuoka (JP); Takashi Imamura, Shizuoka (JP); Atsushi Yasuda, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 0 days.

(21) Appl. No.: 15/422,485

(22) Filed: Feb. 2, 2017

(65) Prior Publication Data
US 2017/0217541 A1    Aug. 3, 2017

(30) Foreign Application Priority Data

Feb. 2, 2016 (JP) .................. 2016-018164

(51) Int. Cl.
*B62M 27/02* (2006.01)
*B62B 13/06* (2006.01)
*B62B 17/04* (2006.01)

(52) U.S. Cl.
CPC ............ *B62M 27/02* (2013.01); *B62B 13/06* (2013.01); *B62B 17/04* (2013.01); *B60Y 2200/252* (2013.01); *B62M 2027/023* (2013.01); *B62M 2027/025* (2013.01); *B62M 2027/026* (2013.01)

(58) Field of Classification Search
CPC ............ B62M 27/02; B62M 2027/025; B62M 2027/026
See application file for complete search history.

(56) References Cited

U.S. PATENT DOCUMENTS

| | | | |
|---|---|---|---|
| 3,871,460 A | 3/1975 | Dehnert | |
| 5,029,664 A | 7/1991 | Zulawski | |
| 5,533,586 A | 7/1996 | Thompson | |
| 6,357,543 B1 | 3/2002 | Karpik | |
| 6,942,050 B1 | 9/2005 | Honkala et al. | |
| 6,942,052 B1 | 9/2005 | Blakely | |
| 7,353,899 B2 | 4/2008 | Abe et al. | |
| 7,360,617 B2 | 4/2008 | Abe et al. | |
| 7,374,188 B2 | 5/2008 | Hibbert et al. | |
| 8,302,721 B2 * | 11/2012 | Yoshihara | B62M 27/02 180/182 |
| 8,360,449 B2 | 1/2013 | Polakowski et al. | |
| 8,408,348 B2 | 4/2013 | Nakamura et al. | |
| 8,408,560 B2 | 4/2013 | Kamioka et al. | |
| 9,174,702 B1 | 11/2015 | Gauthier et al. | |
| 2004/0154850 A1 | 8/2004 | Pyykonen | |

(Continued)

*Primary Examiner* — Kevin Hurley
(74) *Attorney, Agent, or Firm* — HEA Law PLLC

(57) ABSTRACT

The present specification relates to a snowmobile. The upper arm includes two proximal portions connected to the vehicle frame and the upper arm extends outwardly from the two proximal portions in the vehicle width direction and the upper arm is connected to the knuckle. The two proximal portions are rotatable so that the knuckle and the skis can move up and down relative to the vehicle frame. The axis Ax2, passing through the rotation center C2 of the two proximal portions of the upper arm, goes through a position of the rotation center of the secondary shaft or through a position above the rotation center of the secondary shaft. This structure can reduce the force acting on the vehicle body frame via the upper arm and prevent an increase in the force.

8 Claims, 6 Drawing Sheets

(56) References Cited

U.S. PATENT DOCUMENTS

| | | |
|---|---|---|
| 2005/0199433 A1 | 9/2005 | Abe et al. |
| 2008/0185203 A1 | 8/2008 | Matsudo |
| 2010/0140007 A1 | 6/2010 | Ogura et al. |
| 2011/0278083 A1 | 11/2011 | Yoshihara et al. |
| 2013/0032417 A1 | 2/2013 | Sampson |
| 2017/0101142 A1* | 4/2017 | Hedlund .............. B62D 55/104 |
| 2017/0217472 A1* | 8/2017 | Sawai ..................... B62B 13/08 |
| 2018/0094689 A1* | 4/2018 | Sawai ................... F16F 9/3221 |

* cited by examiner

SNOWMOBILE

CROSS-REFERENCE TO RELATED APPLICATION

The present application claims priority from Japanese application JP2016-018164 filed on Feb. 2, 2016, the entire content of which is hereby incorporated by reference into this application.

BACKGROUND OF THE INVENTION

1. Field of the Invention

The present specification relates to a support structure of skis in snowmobiles.

2. Description of the Related Art

As disclosed in US Patent Application Publication No. 2013/0032417, snowmobiles have upper arms and lower arms for supporting the left and right skis. The upper arm and the lower arm include proximal portions connected to the front portion of the vehicle frame. The upper arm and the lower arm include distal ends connected to a knuckle. The ski is connected to the lower end of the knuckle. The proximal portion of the upper arm and the proximal portion of the lower arm are rotatably connected to the vehicle frame so that the ski and the knuckle can move up and down relative to the vehicle frame.

When the ski moves up and down, a force acting on the ski from the snow surface is transmitted to the vehicle frame via the knuckle and the upper arm. At this time, the knuckle works like a lever, and the connecting point between the knuckle and the lower arm works as the fulcrum of the lever. Magnitude of the force acting on the vehicle frame through the upper arm depends on the position (height) of the connecting portion, which is the fulcrum, between the knuckle and the lower arm.

Snowmobiles include a front portion of the vehicle frame that supports the lower arm and the upper arm, and include a drive system, including an engine, located rearward of the front portion of the vehicle frame. The engine includes a crank shaft. The drive system further includes a secondary shaft coupled with the crank shaft through a belt or a gear and receives drive force from the crank shaft. The rotation of the secondary shaft is transmitted to a driving rotating member that is disposed inside and engaged with the track belt. In most snowmobiles, the crank shaft is located in the lower portion of the engine and the secondary shaft is located higher than the crank shaft.

SUMMARY OF THE INVENTION

As described above, the magnitude of the force acting on the vehicle frame through the upper arm depends on the position (height) of the fulcrum that is the connecting portion between the knuckle and the lower arm. In order to reduce the force acting on the vehicle frame through the upper arm, it is preferable that the connecting position between the lower arm and knuckle is close to the ski. That is, it is preferable that the position of the lower arm is low. However, the lower arm at the low position causes a lot of snow to hit it when the vehicle travels in deep snow, resulting in an increase in running resistance.

One of the objects of the present specification is to provide a snowmobile that can reduce the force acting on the vehicle frame through the upper arm and can prevent the force from being increased.

A snowmobile according to a first embodiment described in the present specification includes: a vehicle frame including a ski support frame in a front portion of the vehicle frame; a ski disposed outwardly in a vehicle width direction from the ski support frame; a knuckle including a lower end having the ski connected thereto; an upper arm including a proximal portion connected to the ski support frame and extending outwardly in the vehicle width direction from the proximal portion to connect to the knuckle, the proximal portion being rotatable so that the ski and the knuckle can move up and down relative to the ski support frame; a lower arm disposed below the upper arm, including a proximal portion connected to the ski support frame, and extending outwardly in the vehicle width direction from the proximal portion to connect to the knuckle, the proximal portion being rotatable so that the ski and the knuckle can move up and down relative to the ski support frame; and a drive system including an engine and a secondary shaft, the engine being disposed rearward of the ski support frame and including a crank shaft, the secondary shaft being located higher than the crank shaft and configured to receive a drive force from the crank shaft. The proximal portion of the upper arm has a rotational center and an axis passing through the rotational center, and the axis goes through a position of a rotational center of the secondary shaft in side view of a vehicle body, or through a position above the rotational center of the secondary shaft in side view of the vehicle body. Such a snowmobile can reduce the force acting on the vehicle frame through the upper arm and can prevent the force from being increased.

A snowmobile according to a second embodiment described in the present specification includes: a vehicle frame including a ski support frame in a front portion of the vehicle frame; a ski disposed outwardly in a vehicle width direction from the ski support frame; a knuckle including a lower end having the ski connected thereto; an upper arm including a proximal portion connected to the ski support frame and extending outwardly in the vehicle width direction from the proximal portion to connect to the knuckle, the proximal portion being rotatable so that the ski and the knuckle can move up and down relative to the ski support frame; a lower arm disposed below the upper arm, including a proximal portion connected to the ski support frame, and extending outwardly in the vehicle width direction from the proximal portion to connect to the knuckle, the proximal portion being rotatable so that the ski and the knuckle can move up and down relative to the ski support frame; and a drive system including an engine and a secondary shaft, the engine being disposed rearward of the ski support frame and including a crank shaft, the secondary shaft being located higher than the crank shaft and configured to receive a drive force from the crank shaft. The height from a lower end of the engine to the proximal portion of the upper arm is 300 mm or more in a side view of a vehicle body. In this snowmobile, the upper arm is positioned higher than that of conventional snowmobiles. As a result, this snowmobile can reduce the force acting on the vehicle frame through the upper arm and can prevent the force from being increased.

A snowmobile according to a third embodiment described in the present specification includes: a vehicle frame including a ski support frame in a front portion of the vehicle frame; a ski disposed outwardly in a vehicle width direction from the ski support frame; a knuckle including a lower end having the ski connected thereto; an upper arm including a proximal portion connected to the ski support frame and extending outwardly in the vehicle width direction from the proximal portion to connect to the knuckle, the proximal portion being rotatable so that the ski and the knuckle can move up and down relative to the ski support frame; a lower arm disposed below the upper arm, including a proximal portion connected to the ski support frame, and extending outwardly in the vehicle width direction from the proximal portion to connect to the knuckle, the proximal portion being rotatable so that the ski and the knuckle can move up and down relative to the ski support frame; and a drive system including an engine and a secondary shaft, the engine being disposed rearward of the ski support frame and including a crank shaft, the secondary shaft being located higher than the crank shaft and configured to receive a drive force from the crank shaft. The knuckle has a distance of 430 mm or more between the lower end of the knuckle and an upper end of the knuckle. In such a snowmobile, the upper arm is positioned higher than that of conventional snowmobiles. As a result, this snowmobile can reduce the force acting on the vehicle frame through the upper arm and can prevent the force from being increased.

In the snowmobile described in any one of the above embodiments, at least a portion of the proximal portion of the upper arm may be positioned higher than the rotational center of the secondary shaft.

In the snowmobile described in any one of the above embodiments, each of the upper arm and the lower arm may include a distal end connected to the knuckle, and an intersection point at which the axis passing through the rotational center of the proximal portion of the upper arm crosses an imaginary plane may be located higher than the rotational center of the secondary shaft. In the above, the imaginary plane is defined as a plane that passes through the distal ends of the lower arm and the upper arm and is parallel to the vehicle width direction.

In the snowmobile described in any one of the above embodiments, the upper arm may include a distal end connected to the knuckle, and the height from a lower end of the ski to the distal end of the upper arm may be greater than the height from the lower end of the ski to the rotational center of the secondary shaft.

In the snowmobile described in any one of the above embodiments, the knuckle may include a first connecting portion having the upper arm connected thereto and a second connecting portion having the lower arm connected thereto, and the second connecting portion may be located at substantially the same height as a middle position between the first connecting portion and the lower end of the knuckle or located lower than the middle position.

In the snowmobile described in any one of the above embodiments, the proximal portion of the lower arm may be located higher than a rotational center of the crank shaft of the engine. This can prevent a lot of snow from hitting the lower arm.

The snowmobile described above may further include a suspension including an upper end connected to the ski support frame and a lower end connected to the lower arm. In addition, the upper end of the suspension may be located higher than the rotational center of the secondary shaft. This arrangement of the suspension can prevent the angle between the suspension and the lower arm from decreasing when the position of the lower arm is raised.

In the snowmobile described in any one of the above embodiments, the vehicle frame may include an engine support frame supporting the engine, where the ski support frame is shifted upward relative to the engine support frame.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and are disclosed. Each of these has individual benefit and each can also be used in conjunction with one or more, or in some cases all, of the other disclosed techniques. Accordingly, for the sake of clarity, this description will refrain from repeating every possible combination of the individual techniques in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 1:
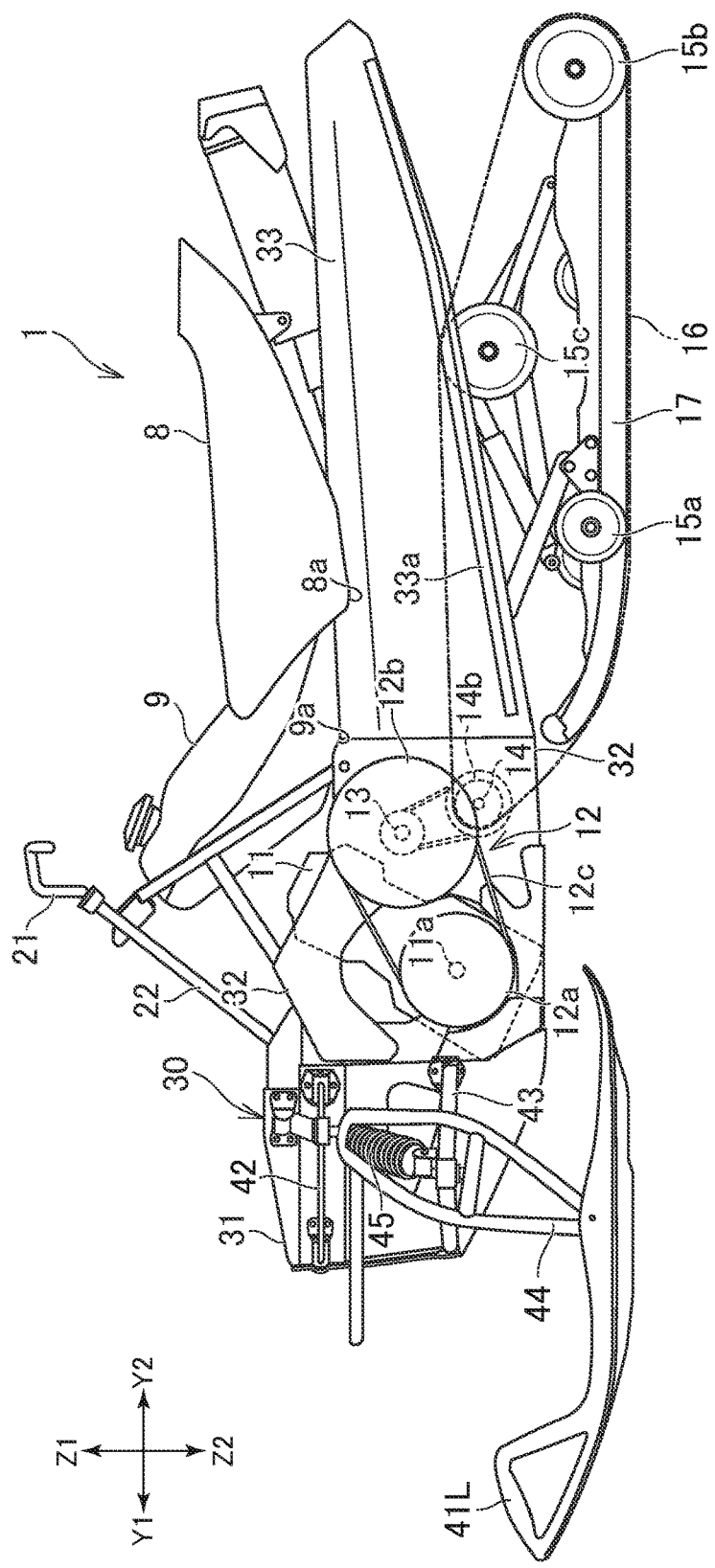
FIG. 1 is a side view of an exemplary snowmobile according to the embodiments. In this figure, the vehicle body cover that constitutes the exterior of the snowmobile is removed.
Figure 2A:
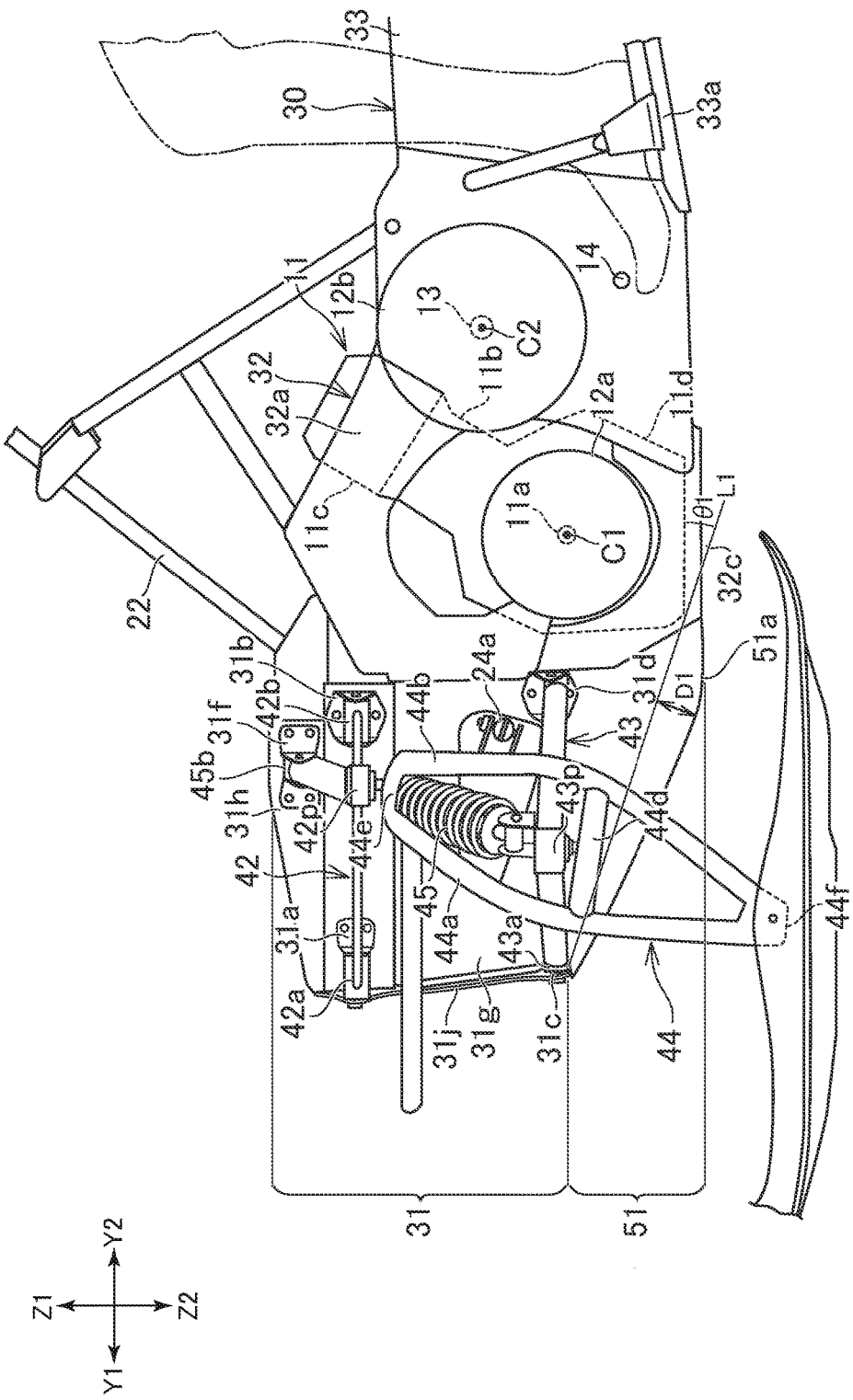
FIG. 2A is a side view showing the front portion of the vehicle body. In this figure, the body cover that constitutes the exterior of the snowmobile is removed.
Figure 2B:
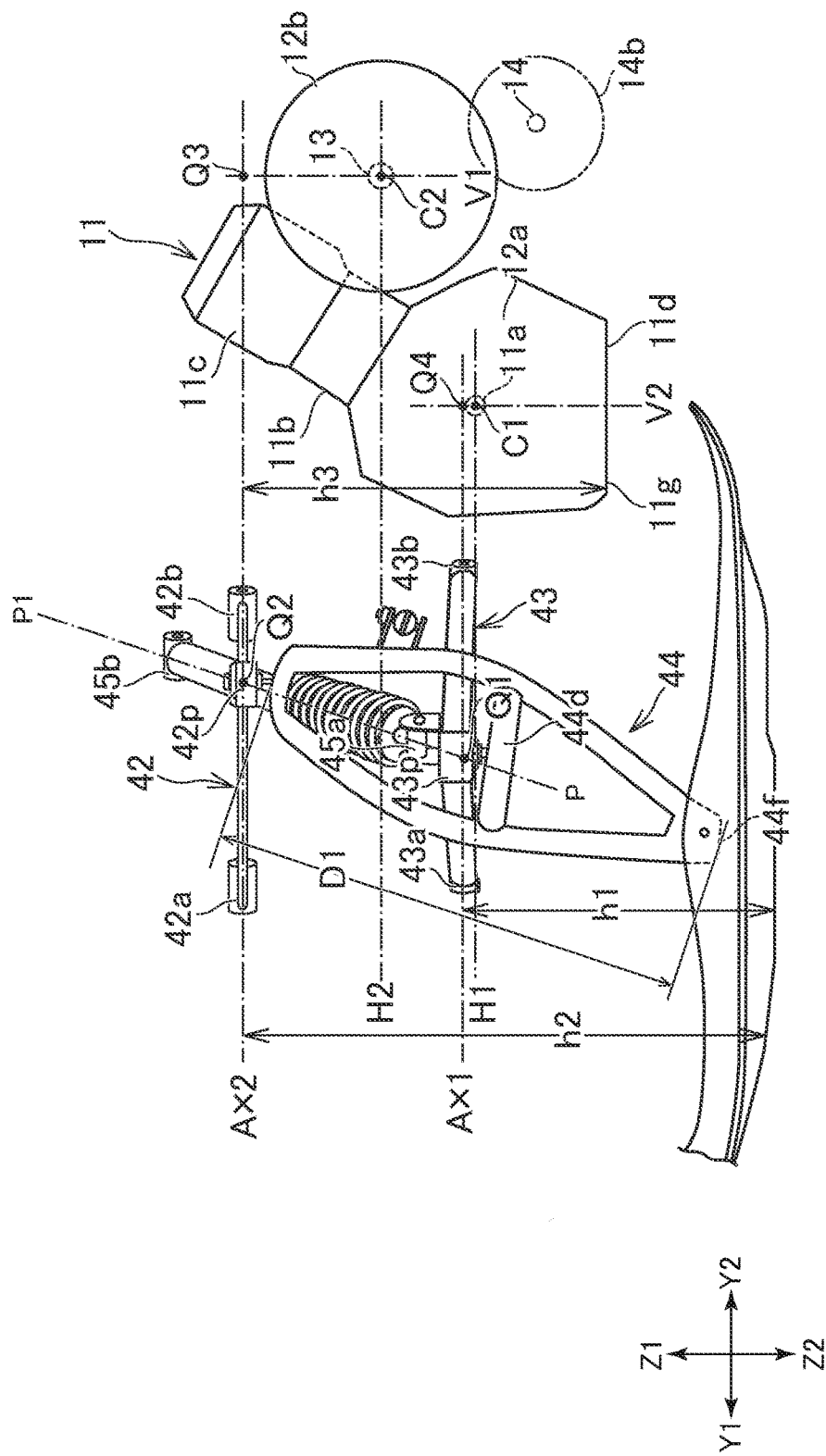
FIG. 2B is a side view illustrating a positional relationship among the arms supporting the skis, suspensions, and the engine.
Figure 3:
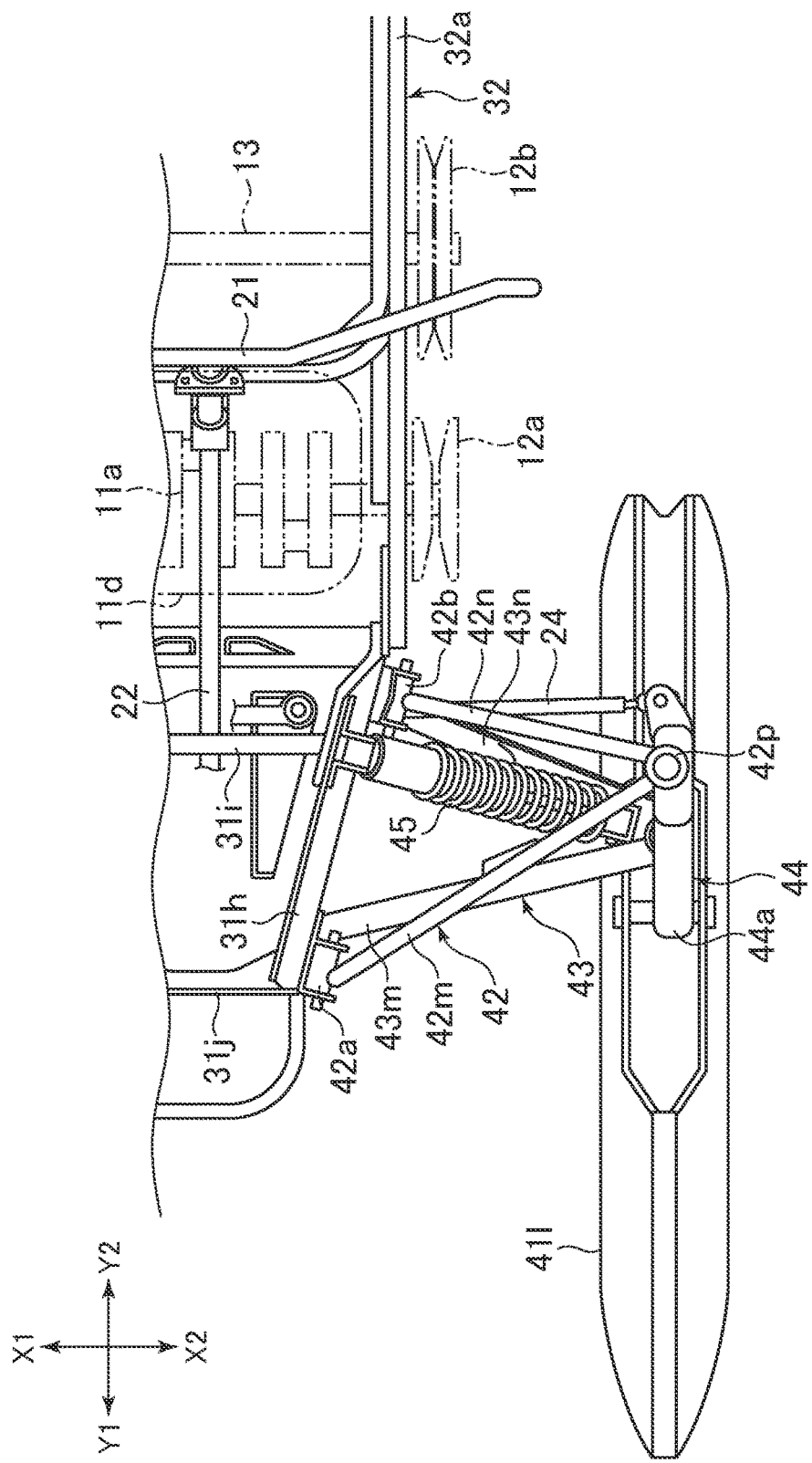
FIG. 3 is a plan view showing the vehicle frame, the left ski, and the suspension.
Figure 4:
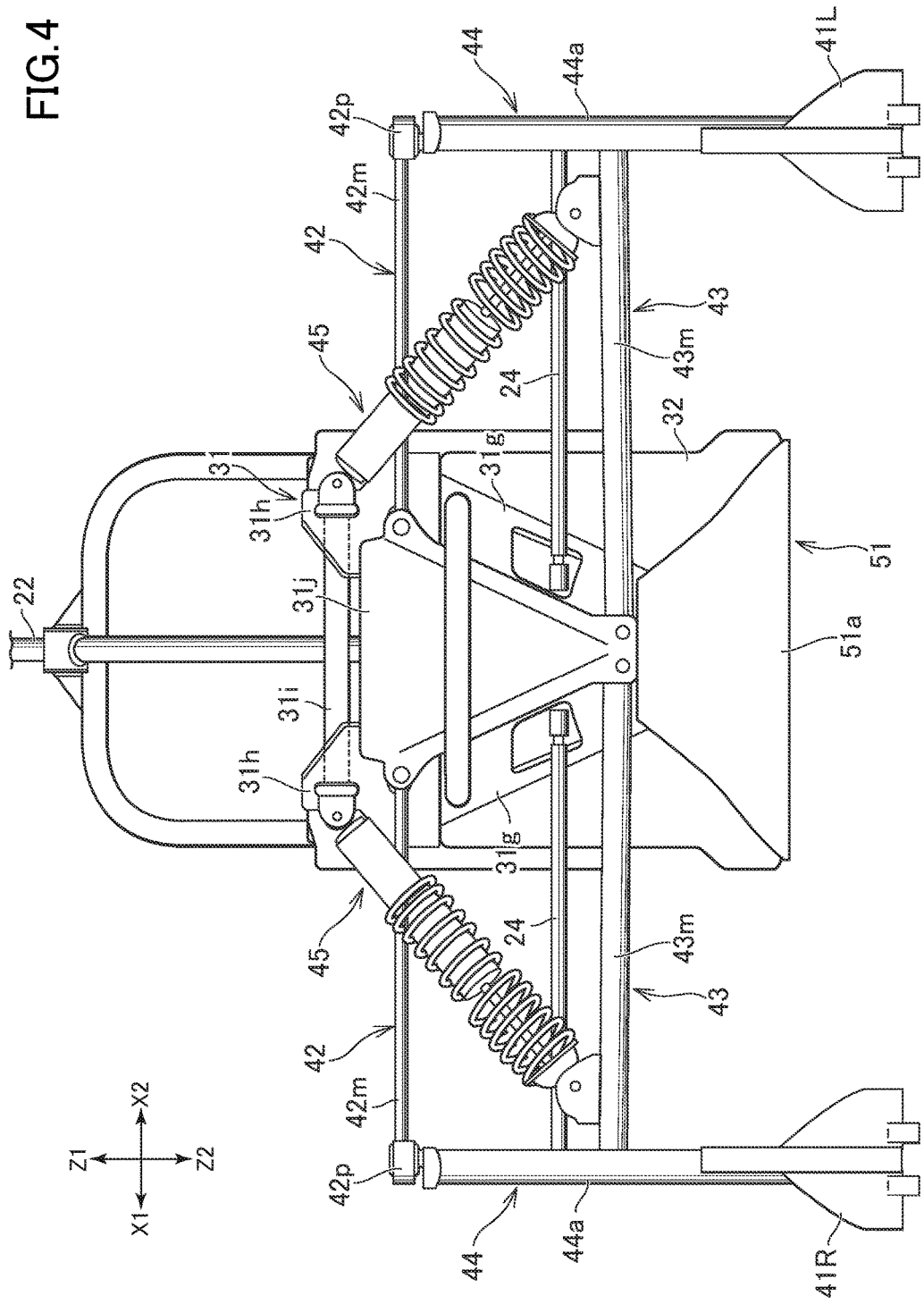
FIG. 4 is a front view showing the vehicle frame, the right and left skis, and the suspensions.
Figure 5:
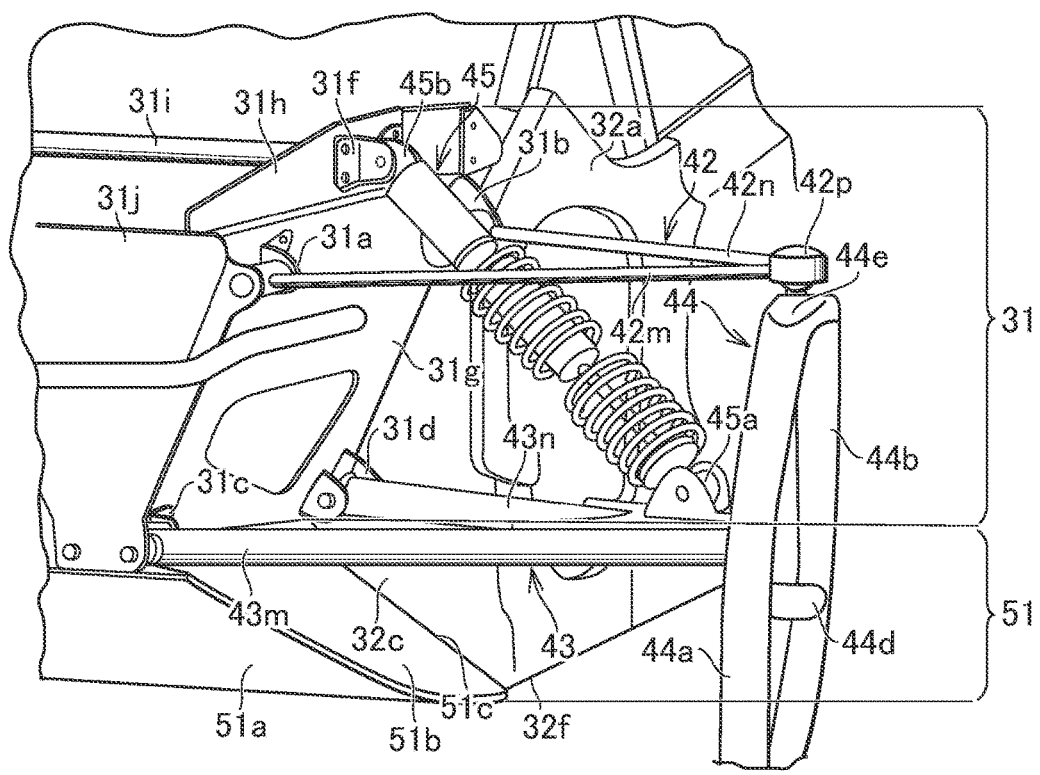
FIG. 5 is a perspective view showing the vehicle frame, the left ski, and the suspension.

The various embodiments will be described by referencing the appended figures. FIG. 1 is a side view of one snowmobile embodiment. FIG. 2A is a side view showing the front portion of the vehicle body. In FIGS. 1 and 2A, the vehicle body cover that constitutes the exterior of the snowmobile is removed. FIG. 2B is a side view illustrating a positional relationship among the arms 42 and 43 supporting the skis 41R and 41L, suspensions 45, and the engine 11. FIG. 3 is a plan view showing the vehicle frame 30, the left ski 41L, and the suspension 45. FIG. 4 is a front view showing the vehicle frame 30, the right and left skis 41R and 41L, and the suspensions 45. FIG. 5 is a perspective view showing the vehicle frame 30, the left ski 41L, and the suspension 45.

In the following description, Y1 and Y2 illustrated in the above described in drawings indicate forward and rearward directions, respectively. Further, Z1 and Z2 indicate upward and downward directions, respectively. X1 and X2 indicate rightward and leftward directions, respectively.

As shown in FIG. 1, the snowmobile 1 includes a drive system for driving the track belt 16. The drive system includes an engine 11, a transmission 12, a secondary shaft 13 and a track belt drive shaft 14.

The engine 11 includes a crank case 11$d$ (see FIG. 3) accommodating the crankshaft 11$a$. As shown in FIG. 2A, the engine 11 includes a cylinder block 11$b$ attached to the crank case 11$d$ and a cylinder head 11$c$ attached to the cylinder block 11$b$. The cylinder block 11$b$ has a cylinder formed therein. The cylinder head 11$c$ has an intake passage and an exhaust passage formed therein that are connected to the combustion chamber inside the cylinder. In the example of snowmobile 1, the crank case 11$d$ is located further rearward than a ski support frame 31 (see FIG. 1) constituting the front portion of the vehicle frame 30 (the ski support frame 31 will be described later). The cylinder block 11$b$ and the cylinder head 11$c$ are attached to the upper side of the crank case 11$d$ and arranged such that the axis line of the cylinder is inclined backward. Accordingly, the engine 11 does not overlap with the later-described arms 42 and 43 supporting the skis 41R and 41L in side view of the vehicle body. The posture of engine 11 is not limited to the example of snowmobile 1. For example, a part of the engine 11 may overlap with the arms 42 and 43 in side view of the vehicle body.

The transmission 12 is, for example, a continuously variable transmission, and includes a driving pulley 12$a$ receiving a torque from a crank shaft 11$a$ and a driven pulley 12$b$ receiving a torque from the driving pulley 12$a$, as shown in FIG. 2A. A belt 12$c$ (see FIG. 1) is wound around the pulleys 12$a$ and 12$b$ for transmitting the torque of the driving pulley 12$a$ to the driven pulley 12$b$. In the example of snowmobile 1, the driving pulley 12$a$ is mounted on the crank shaft 11$a$. The driven pulley 12$b$ is mounted on the secondary shaft 13. The secondary shaft 13 is located further rearward and higher than the crank shaft 11$a$. The driving pulley 12$a$ and the driven pulley 12$b$ are mounted, for example, at the end of the crank shaft 11$a$ and the end of the secondary shaft 13, respectively. As shown in FIG. 3, the driving pulley 12$a$ and the driven pulley 12$b$ are located, for example, outwardly in the vehicle width direction from a later-described engine support frame 32 (pulleys 12$a$ and 12$b$ are located leftward in the vehicle width direction from the engine support frame 32, in the example of snowmobile 1). Unlike the example of snowmobile 1, the driving pulley 12$a$ and the driven pulley 12$b$ may be located inside the engine support frame 32 in the vehicle width direction.

The arrangement of the transmission 12 is not limited to the example of snowmobile 1. For example, the driving pulley 12$a$ may be mounted on a primary shaft different from the crank shaft 11$a$. In still another example, the transmission 12 is not a continuously variable transmission. In the present specification, "secondary shaft" means a shaft on which the driven member of the transmission 12 is mounted. That is, for the snowmobile including the continuously variable transmission as the transmission 12, the secondary shaft means the shaft on which the driven pulley 12$b$ is mounted. For a snowmobile including a gear type transmission as the transmission 12, the secondary shaft means a shaft on which the driven gear of the transmission 12 is mounted (the driven gear means a gear that engages with a driving gear mounted on the primary shaft).

The track belt drive shaft 14 is connected to the secondary shaft 13 through a belt, a chain, and the like, and receives a torque from the secondary shaft 13 to rotate it. As shown in FIG. 1, the track belt drive shaft 14 has a sprocket 14$b$ mounted thereon that is located inside the track belt 16 and is engaged with the track belt 16. Guide wheels 15$a$, 15$b$ and 15$c$ for guiding the track belt 16 and a slide rail 17 for guiding the track belt 16 are further arranged inside the track belt 16. The slide rail 17 presses the track belt 16 toward the snow surface.

As shown in FIG. 1, the seat 8 is disposed above the track belt 16. The snowmobile 1 includes, in front of the seat 8, a steering handle 21 for the driver to steer the skis 41R and 41L. In addition, the snowmobile 1 includes a steering column 22 extending diagonally downward and forward from the center portion of the steering handle 21. The steering handle 21 is connected to the skis 41R and 41L through the steering column 22, a tie rod 24 (see FIG. 4) and a knuckle 44 which will be described later. The snowmobile 1 includes a fuel tank 9 for storing the fuel for the engine 11. As shown in FIG. 1, the fuel tank 9 is disposed, for example, between the steering column 22 and the seat 8. In the example of snowmobile 1, the engine 11 is located below the steering column 22 and the fuel tank 9.

The snowmobile 1 includes the right ski 41R and the left ski 41L (see FIG. 4). As shown in FIG. 2A, the vehicle frame 30 of the snowmobile 1 includes a ski support frame 31. The skis 41R and 41L are disposed outwardly in the vehicle width direction from the ski support frame 31. That is, the right ski 41R is disposed in the right direction of the ski support frame 31, and the left ski 41L is disposed in the left direction of the ski support frame 31. The snowmobile 1 includes an upper arm 42 and a lower arm 43 located below the upper arm 42. The upper arm 42 includes proximal portions 42$a$ and 42$b$ connected to the ski support frame 31 and extends outwardly from the proximal portions 42$a$ and 42$b$ in the vehicle width direction. The lower arm 43 includes proximal portions 43$a$ and 43$b$ connected to the ski support frame 31 and extends outwardly from the proximal portions 43$a$ and 43$b$ in the vehicle width direction. That is, the snowmobile 1 includes an upper arm 42 and a lower arm 43 that are located to the right of the ski support frame 31 and that connect the ski support frame 31 and the right ski 41R. In addition, the snowmobile 1 includes a left arm 42 and a lower arm 43 that are located to the left of the ski support frame 31 and that connect the ski support frame 31 and the left ski 41L. The distal end 42$p$ of the upper arm 42 and the distal end 43$p$ of the lower arm 43 are connected to the knuckle 44. The skis 41R and 41L are connected to the lower ends 44$f$ of the knuckles 44. In the present specification, "ski support frame" means a portion of the vehicle frame 30 to which the proximal portions 43$a$ and 43$b$ of the lower arm 43 and the proximal portions 42$a$ and 42$b$ of the upper arm 42 are connected. The ski support frame 31 may be integrally formed with another part of the vehicle frame 30 (for example, an engine support frame 32 to be described later). Alternatively, the ski support frame 31 may be formed separately from other portions of the vehicle frame 30 and may be fixed to the other portion by a fixing means such as bolts or welding.

In the example of snowmobile 1, as shown in FIG. 4, the proximal portions 43a and 43b of the lower arm 43 are located closer to the center in the vehicle width direction than the proximal portions 42a and 42b of the upper arm 42. On the other hand, in the left-right direction (the vehicle width direction), the position of the distal end of the upper arm 42 is substantially equal to the position of the distal end of the lower arm 43. Therefore, the lower arm 43 is longer than the upper arm 42.

The proximal portions 42a, 42b, 43a and 43b of the arms 42 and 43 are rotatably connected to the ski support frame 31. That is, the proximal portions 42a, 42b, 43a and 43b of the arms 42 and 43 are connected to the ski support frame 31 so that the arms 42 and 43 can move up and down about the proximal portions 42a, 42b, 43a and 43b. These connections of the arms 42 and 43 allow the knuckle 44 and the skis 41R and 41L to move up and down relative to the vehicle frame 30. As shown in FIG. 3, the upper arm 42 includes a front rod 42m and a rear rod 42n located behind the front rod 42m. The lower arm 43 includes a front rod 43m and a rear rod 43n located behind the front rod 43m. The proximal portion 42a of the front rod 42m, the proximal portion 42b of the rear rod 42n, the proximal portion 43a of the front rod 43m, and the proximal portion 43b of the rear rod 43n are connected to the ski support frame 31. The proximal portions 42a, 42b, 43a and 43b are provided with shafts. The shafts of the proximal portions 42a, 42b, 43a, and 43b are supported by the arm connecting portions 31a, 31b, 31c, and 31d (see FIGS. 2A and 5) formed on the lateral side of the ski support frame 31, respectively.

In the example of snowmobile 1, the ski support frame 31 is formed of a plurality of panels. For example, as shown in FIG. 4, the ski support frame 31 includes left and right side panels 31g located away from each other in the vehicle width direction (left-right direction), and a front panel 31f fixed to the front edges of the left and right side panels 31g. The arm connecting portions 31a, 31b, 31c, and 31d supporting the arms 42 and 43 may be fixed to the panels 31f and 31g by welding, or integrally formed with the panels 31f and 31g.

As shown in FIG. 4, in the example of snowmobile 1, the side panel 31g is obliquely arranged toward the center of the vehicle width direction. The side panel 31g extends from the portion having the proximal portions 42a and 42b of the upper arm 42 connected thereto (that is, the portion having the arm connecting portions 31a and 31b formed thereon) to the portion having the proximal portions 43a and 43b of the lower arm 43 connected thereto (that is, the portion having the arm connecting portions 31c and 31d formed thereon). The width of the front panel 31f in the left-right direction gradually decreases downward in conformity with the inclination of the left and right side panels 31g. The structure of the ski support frame 31 is not limited to the example described here. For example, the ski support frame 31 may be composed of a plurality of pipes. In this case, the arm connecting portions 31a, 31b, 31c, and 31d may be fixed to the pipes.

The upper arm 42 is substantially triangular in a plan view thereof, and the two rods 42m and 42n of the upper arm 42 are connected to a common end (that is, the distal end 42p of the upper arm 42). The lower arm 43 is also substantially triangular in a plan view thereof, and the two rods 43m and 43n of the lower arm 43 are connected to a common end (that is, the distal end 43p of the lower arm 43). The distal end 42p of the upper arm 42 is connected to the knuckle 44 with a ball joint, for example, so that the angle between the knuckle 44 and the upper arm 42 can change. Likewise, the distal end 43p of the lower arm 43 is connected to the knuckle 44 with a ball joint, for example, so that the angle between the knuckle 44 and the lower arm 43 can change.

As shown in FIG. 2A, the engine 11 is disposed rearward of the ski support frame 31. The vehicle frame 30 includes an engine support frame 32 supporting the engine 11. For example, the engine support frame 32 includes side frames 32a (see FIGS. 3 and 5) located along left and right side faces of the engine 11. The engine support frame 32 includes a lower frame 32c covering the lower side and the front side of the engine 11 and fixed to the lower portion of the side frame 32a. The ski support frame 31 is fixed to the front side of the engine support frame 32. The structure of the engine support frame 32 and the structure of the ski support frame 31 are not limited to the example of snowmobile 1 and may be changed.

The lower arm 43 of the snowmobile 1 is supported at a higher position than that of conventional snowmobiles. Specifically, as shown in FIG. 2B, the proximal portions 43a and 43b of the lower arm 43 are connected to the ski support frame 31 at a position higher than the lower end 11g of the engine 11. Also, the proximal portions 43a and 43b of the lower arm 43 are positioned higher than the rotational center C1 of the crank shaft 11a. In other words, the proximal portions 43a and 43b of the lower arm 43 are located above the horizontal plane H1 passing through the rotational center C1 in side view of the vehicle body. The horizontal plane H1 is defined as a plane parallel to skis 41R and 41L in a state in which no load is applied to the vehicle body. "A state in which no load is applied to the vehicle body" means a state in which the driver does not ride on the vehicle and only the vehicle's own weight is applied to the vehicle body. The two proximal portions 43a and 43b of the lower arm 43 may be located at approximately the same height as the rotational center C1 of the crank shaft 11a. That is, the horizontal plane H1 may cross the proximal portions 43a and 43b of the lower arm 43 in side view of the vehicle body.

The above described layout can raise the position of the lower arm 43, while keeping the center of gravity of the driving system low. In other words, the center of gravity of the vehicle body is prevented from becoming high, and running resistance can be reduced when the vehicle travels in deep snow. In some snowmobiles, the height of the center of gravity of the drive system including the engine is located in a range from the vicinity of the crank shaft of the engine to the vicinity of the height of the secondary shaft. In conventional snowmobiles, since the lower arm is connected to the vehicle frame at the almost same height as the lower end of the engine, the center of gravity of the driving system and the position of the lower arm are greatly apart in the vertical direction. Unlike conventional snowmobiles, since the proximal portions 43a and 43b of the lower arm 43 in the snowmobile 1 are located higher than the rotational center C1 of the crank shaft 11a, the height of the lower arm 43 is closer to the height of the center of gravity of the drive system than that in the conventional snowmobiles. As a result, running resistance when traveling in deep snow can be reduced without raising the center of gravity of the vehicle body in the vertical direction.

As shown in FIG. 2B, in the example of snowmobile 1, the height h1 from the lower ends of the skis 41R and 41L to the proximal portions 43a and 43b of the lower arm 43 is 320 mm or more in a state where no load is applied to the vehicle body. By setting the height h1 at these levels, the position of the lower arm 43 is higher than that of the conventional snowmobiles, and as a result, the running resistance can be reduced when the vehicle travels in deep snow. The height h1 may preferably be between 330 mm and 550 mm.

In another example of the snowmobile, the position of the proximal portion of one of the two proximal portions 43a and 43b of the lower arm 43 may be higher than the rotational center C1 of the crank shaft 11a, whereas the position of the other proximal portion may be lower than the rotational center C1 of the crank shaft 11a. For example, the lower arm 43 may be inclined such that the proximal portion 43a of the front rod 43m is higher than the proximal portion 43b of the rear rod 43n. In that case, the proximal portion 43a of the front rod 43m may be located higher than the horizontal plane H1 and the proximal portion 43b of the rear rod 43n may be located lower than the horizontal plane H1.

In still another example of the snowmobile, a different portion from the proximal portions 43a and 43b of the lower arm 43 may be located higher than the horizontal plane H1 in a state in which no load is applied to the vehicle body. For example, the lower arm 43 may be curved such that the middle portion in the left-right direction of the lower arm 43 bulges upward. In this case, the highest portion of the lower arm 43 may be located higher than the horizontal plane H1.

The proximal portions 43a and 43b of the lower arm 43 rotate about the axis Ax1 shown in FIG. 2B. The axis Ax1 passes through a position above the rotational center C1 of the crank shaft 11a. That is, the intersection point Q4 at which the axis Ax1 crosses the vertical line V2 passing through the rotational center C1 is positioned higher than the rotational center C1. Unlike the example of snowmobile 1, the axis Ax1 may pass through the position of the rotational center C1 of the crank shaft 11a. That is, the intersection point Q4 is positioned at approximately the same height as the rotational center C1. The lower arm 43 may be inclined such that its front portion is higher than its rear portion, and thus the axis Ax1 may be inclined relative to the horizontal plane H1. In this case, unlike the example of snowmobile 1, the axis Ax1 may go through the position below the rotational center C1 of the crank shaft 11a.

As described above, the distal end 43p of the lower arm 43 and the distal end 42p of the upper arm 42 are connected to the knuckle 44. The plane P1 shown in FIG. 2B is an imaginary plane passing through the distal end 43p of the lower arm 43 and the distal end 42p of the upper arm 42 and parallel to the vehicle width direction. As shown in FIG. 2B, the intersection point Q1 at which the plane P1 and the axis Ax1 cross each other may be located higher than the rotational center C1 of the crank shaft 11a. That is, the intersection point Q1 may be located above the horizontal plane H1.

As shown in FIG. 1, the vehicle frame 30 includes a belt housing 33 covering the upper side of the track belt 16. The seat 8 is located above the belt housing 33. The belt housing 33 includes, on the lateral sides thereof, foot rests 33a for the driver to rest the driver's feet on. The foot rest 33a extends rearward from the foremost portion of the belt housing 33. As shown in FIG. 2A, the proximal portions 43a and 43b of the lower arm 43 are located higher than the foot rest 33a. This positional relationship can effectively prevent a lot of snow from hitting the lower arm 43, if the foot rest 33a is located at a low position. In the example of snowmobile 1, the lower arm 43 is located higher than the foremost portion of the foot rest 33a.

As described above, the snowmobile 1 includes a track belt drive shaft 14. As shown in FIG. 2B, the proximal portions 43a and 43b of the lower arm 43 may be positioned higher than the rotational center of the track belt drive shaft 14. Further, the proximal portions 43a and 43b of the lower arm 43 may be located higher than the lower end of the driving pulley 12a of the transmission 12.

As described above, the distal end 43p of the lower arm 43 is connected to the knuckle 44. As shown in FIG. 2B, the distal end 43p of the lower arm 43 is located higher than the lower end 11g of the engine 11 in a state where no load is applied to the vehicle body. "A state where no load is applied to the vehicle body" means, as described above, a state in which the driver does not ride on the vehicle and only the vehicle's own weight is applied to the vehicle body. In the example of snowmobile 1, the lower arm 43 is arranged substantially in parallel with the horizontal plane in a state where no load is applied to the vehicle body. Therefore, the distal end 43p of the lower arm 43 is positioned higher than the rotational center C1 of the crank shaft 11a, similarly to the proximal portions 43a and 43b. In other words, the distal end 43p of the lower arm 43 is located above the horizontal plane H1 passing through the rotational center C1 of the crank shaft 11a. Unlike the example of snowmobile 1, the lower arm 43 may extend obliquely downward and outwardly in the vehicle width direction from the proximal portions 43a and 43b in a state where no load is applied to the vehicle body. In that case, the distal end 43p of the lower arm 43 may be positioned below the horizontal plane H1.

In the example of snowmobile 1, the height h1 from the lower ends of the skis 41R and 41L to the proximal portions 43a and 43b of the lower arm 43 is greater than half of the height h2 from the lower ends of the skis 41R and 41L to the proximal portions 42a and 42b of the upper arm 42. Also, the height from the lower ends of the skis 41R and 41L to the distal end 43p of the lower arm 43 is larger than half of the height from the lower ends of the skis 41R and 41L to the distal end 42p of the upper arm 42.

In the example of snowmobile 1, similarly to the lower arm 43, the upper arm 42 is connected to the ski support frame 31 at a high position. More specifically, as shown in FIG. 2B, the proximal portions 42a and 42b of the upper arm 42 are connected to the ski support frame 31 at a position higher than the rotational center C2 of the secondary shaft 13. That is, the proximal portions 42a and 42b of the upper arm 42 are positioned above the horizontal plane H2 passing through the rotational center C2 of the secondary shaft 13. The proximal portions 42a and 42b of the upper arm 42 are rotatable about the axis Ax2 (see FIG. 2B) so that the upper arm 42 can move up and down about the proximal portions 42a and 42b. The axis Ax 2 of the proximal portions 42a and 42b passes through a position above the rotational center C2 of the secondary shaft 13. That is, the intersection point Q3 at which the axis Ax 2 crosses the vertical line V1 passing through the rotational center C2 is located above the rotational center C2.

The above described location of the upper arm 42 can reduce the force acting on the vehicle frame 30 from the knuckle 44 via the upper arm 42 or prevent an increase of force. More specifically, when the skis 41R and 41L moves up and down, the force acting on the skis 41R and 41L from the snow surface is transmitted to the vehicle frame 30 via the upper arm 42 and the knuckle 44. At this time, the knuckle 44 works like a lever, and the connecting portion between the knuckle 44 and the lower arm 43 words as the fulcrum of the lever. For example, when skis 41R and 41L move upward, the left and right knuckles 44 tilt such that the lower ends thereof widen outwardly in the vehicle width direction because the upper arms 42 are shorter than the lower arms 43. At this time, the knuckle 44 and the vehicle frame 30 pull each other through the upper arm 42. That is, a pulling force acts between the knuckle 44 and the vehicle frame 30 via the upper arm 42. In the example of snowmobile 1, the upper arms 42 are supported at a position higher than the convention snowmobiles. Therefore, a sufficient distance can be ensured between the distal end 43p of the lower arm 43 and the distal end 42p of the upper arm 42 in the vertical direction (as described above, the distal end 43p is the connection portion between the lower arm 43 and the knuckle 44, and the distal end 42p is the connection portion between the upper arm 42 and the knuckle 44). As a result, the lever ratio of the knuckle 44 reduces, and thus the force acting on the vehicle frame 30 from the knuckle 44 via the upper arm 42 can be reduced. Alternatively, as a result, it can be prevented that the force acting on the vehicle frame 30 from the knuckle 44 via the upper arm 42 is increased due to raising the position of the lower arm 43.

In some snowmobiles, the height of the center of gravity of the drive system, including the engine, is located in the range from the vicinity of the crank shaft of the engine to the vicinity of the secondary shaft. In the example of snowmobile 1, the rotational center C2 of the secondary shaft 13 is located lower than the axis Ax2 of the proximal portions 42a and 42b. Therefore, it is possible to keep the center of gravity of the driving system at a low position. In other words, it is possible to prevent the center of gravity of the vehicle body from becoming high.

Unlike the example of FIG. 2B, the proximal portions 42a and 42b of the upper arm 42 may be arranged such that the axis Ax2 passes through the rotational center C2 of the secondary shaft 13. The two proximal portions 42a and 42b of the upper arm 42 may be located at approximately the same height and the axis Ax2 may be arranged horizontally. In another example, the lower arm 43 may be inclined such that the proximal portion 43a of the front rod 43m is higher than the proximal portion 43b of the rear rod 43n. In addition, the axis Ax2 may be inclined relative to the horizontal plane H2.

In the example of snowmobile 1, in a side view of the vehicle body, the height h2 (see FIG. 2B) from the lower end of the skis 41R and 41L to the proximal portions 42a and 42b of the upper arm 42 is 550 mm or more. The height h2 is preferably 560 mm or more. In a side view of the vehicle body, the height h3 (see FIG. 2B) from the lower end 11g of the engine 11 to the proximal portions 42a and 42b of the upper arm 42 is 300 mm or more. The height h3 may be 350 mm or more. The height h3 may be 380 mm or more.

As shown in FIG. 2B, in the example of snowmobile 1, the proximal portions 42a and 42b of the upper arm 42 are positioned higher than the upper end of the driven pulley 12b. That is, the intersection point Q3, at which the axis Ax2 crosses the vertical line V1 passing through the rotational center C2 of the secondary shaft 13, is located above the upper end of the driven pulley 12b. The proximal portions 42a and 42b of the upper arm 42 may be located at approximately the same height as the upper end of the driven pulley 12b.

As described above, the distal end 42p of the upper arm 42 is connected to the knuckle 44. In a state where no load is applied to the vehicle body, the position of the distal end 42p of the upper arm 42 is higher than the position of the rotational center C2 of the secondary shaft 13. That is, in a state where no load is applied to the vehicle body, the height from the lower ends of the skis 41R and 41L to the distal end 42p of the upper arm 42 is greater than the height from the lower ends of the skis 41R and 41L to the rotational center C2 of the secondary shaft 13.

FIG. 2B shows an imaginary plane P1 passing through the distal end 43p of the lower arm 43 and the distal end 42p of the upper arm 42 and where imaginary plane P1 is parallel to the vehicle width direction. The intersection point Q2, at which the axis Ax2 passing through the rotational center of the proximal portions 42a and 42b of the upper arm 42 crosses the imaginary plane P1, is located higher than the rotational center C2 of the secondary shaft 13. That is, the intersection point Q2 is located above the horizontal plane H2.

The skis 41R and 41L are connected to the lower ends 44f of the knuckles 44. The upper arm 42 is connected to the upper end 44e (the first connecting portion) of the knuckle 44. The distance D1 (see FIG. 2B) from the lower end 44f of the knuckle 44 to the upper end 44e is, for example, 430 mm or more. The distance D1 may be 470 mm or more. The distance D1 may be 500 mm or more.

In the example of snowmobile 1, the knuckle 44 includes a crossbar 44d (second connecting portion) in a midway portion thereof in the vertical direction. The lower arm 43 is connected to the crossbar 44d. In the example of snowmobile 1, the cross bar 44d is positioned lower than the middle position (center position) between the lower end 44f and the upper end 44e of the knuckle 44. In another example, the cross bar 44d may be located at approximately the same height as the middle position between the lower end 44f and the upper end 44e of the knuckle 44. In still another example, the cross bar 44d may be located higher than the middle position between the lower end 44f and the upper end 44e of the knuckle 44.

As described above, the vehicle frame 30 includes an engine support frame 32 and a ski support frame 31. As shown in FIG. 2A, the ski support frame 31 is located foreword of and connected to the engine support frame 32. In the example of snowmobile 1, the ski support frame 31 is shifted upward relative to the engine support frame 32. That is, as shown in FIG. 5, the lower end 31e at the rearmost portion of the ski support frame 31 is connected to the engine support frame 32 and is located upward from the lower end 32f of the engine support frame 32. This allows the lower arm 43 and the upper arm 42 to be supported at high positions.

As shown in FIG. 5, the ski support frame 31 includes, at the lowermost position thereof, arm connecting portions 31c and 31d for supporting the proximal portions 43a and 43b of the lower arm 43. In other words, the ski support frame 31 includes a portion located upward from the lower end 32f of the foremost of the engine support frame 32. The portion has the arm connecting portions 31c and 31d formed thereon. As described above, in the example of snowmobile 1, the ski support frame 31 is composed of a plurality of panels 31f and 31g. The arm connecting portions 31a and 31b are fixed to the lowermost portion of the side panel 31g. The lower end 31e of the rearmost portion of the side panel 31g is connected to the engine support frame 32. In another example, the ski support frame 31 may be composed of a plurality of pipes. In the other example, a pipe having the arm connecting portions 31c and 31d formed thereon may be located upward from the lower end 32f of the engine support frame 32 and connected to the engine support frame 32. In the example of snowmobile 1, the ski support frame 31 and the engine support frame 32 are formed separately and are fixed to each other by a fixing means such as welding or bolts, for example. Alternatively, the ski support frame 31 and the engine support frame 32 may be integrally formed.

FIG. 2A shows a straight line L1 that is an imaginary straight line connecting the foremost of the proximal portion 43a of the front rod 43m of the lower arm 43 and the lower end 11g of the engine 11. As described above, the proximal portion 43a of the lower arm 43 is connected to the ski support frame 31 at a position higher than the lower end 11g of the engine 11. Therefore, the straight line L1 is inclined relative to the horizontal plane passing through the lower end 11g of the engine 11. In the example of snowmobile 1, the angle θ1 between the imaginary straight line L1 and the horizontal plane is between 15 degrees and 45 degrees¥ in a side view of the vehicle body.

As shown in FIG. 5, a cover member 51 is disposed under the ski support frame 31. The cover member 51 includes a lower surface portion 51a covering the lower side of the ski support frame 31 and extending obliquely forward and upward. The cover member 51 prevents a lot of snow from hitting the lower portion of the engine support frame 32 and prevents a lot of snow from hitting the lower portion of the engine 11. In the example of snowmobile 1, the lower surface portion 51a of the cover member 51 extends obliquely forward and upward from the lower end 32f of the foremost of the engine support frame 32.

As shown in FIG. 2A, in the example of snowmobile 1, the lower surface portion 51a is curved so as to bulge downward. In a side view of the vehicle body, the distance between the lower surface portion 51a and the imaginary straight line L1 is the maximum D1 at the midway position between the front end of the lower surface portion 51a and the rear end of the lower surface portion 51a.

As shown in FIG. 5, the cover member 51 includes lateral surface portions 51b. The lateral surface portion 51b extends upward in a side view of the vehicle body from the lower surface portion 51a and is connected to the lower portion of the ski support frame 31. In the example of snowmobile 1, the lateral surface portion 51b extends diagonally upward from the lower surface portion 51a toward the center of the vehicle, in a vehicle width direction. More specifically, the lateral surface portions 51b obliquely extend from the left and right edges of the lower surface portion 51a toward the lower edges of the ski support frame 31. When snow falls on the lateral surface portion 51b, the snow flows downward on the lateral surface portion 51b. Therefore, it is possible to prevent snow from collecting on the upper side of the cover member 51. The lateral surface portion 51b may not be inclined. That is, the lateral surface portion 51b may be arranged vertically. In still another example, the cover member 51 does not include the lateral surface portion.

In the example of snowmobile 1, the cover member 51 is formed separately from the ski support frame 31 and is fixed to the ski support frame 31 by a fixing means such as welding or bolts. As shown in FIG. 5, the rear edge 51c of the lateral surface portion 51b is connected to the engine support frame 32. In the example of snowmobile 1, the cover member 51 is formed separately from the engine support frame 32 and is fixed to the engine support frame 32 by a fixing means such as welding or bolts. More specifically, the rear edge 51c of the lateral surface portion 51b is fixed to the front surface of the lower frame 32c of the engine support frame 32. The connecting structure of the cover member 51 is not limited to the example of snowmobile 1. For example, the cover member 51 may be integrally formed with a member of the ski support frame 31. Alternatively, the cover member 51 may be integrally formed with a member of the engine support frame 32.

As shown in FIG. 2A, the snowmobile 1 includes suspension 45. The upper ends 45b of the suspensions 45 are connected to the ski support frame 31. The suspension 45 is located between the front rod 42m and the rear rod 42n of the upper arm 42. The upper end 45b of the suspension 45 is located higher than the proximal portions 42a and 42b of the upper arm 42. The lower end 45a of the suspension 45 is connected to the lower arm 43.

As shown in FIG. 2B, the upper end 45b of the suspension 45 is positioned higher than the rotational center C2 of the secondary shaft 13. That is, the upper end 45b of the suspension 45 is located above the horizontal plane H2 passing through the rotational center C2. This arrangement of the suspension 45 prevents the angle between the suspension 45 and the lower arm 43 from decreasing due to raising the position of the lower arm 43. As a result, the suspension 45 can effectively receive the force acting on the lower arm 43 when the skis 41R and 41L move up and down, and provide a suitable damping function.

As shown in FIG. 5, the ski support frame 31 includes a suspension connecting portion 31f to which the upper end 45b of the suspension 45 is connected. The ski support frame 31 includes a portion protruding upward from a portion on which the arm connecting portions 31a, 31b, 31c, and 31d are formed. The protruding portion has the suspension connecting portion 31f formed thereon. In the example of snowmobile 1, the ski support frame 31 includes the side panel 31g to which the arm connecting portions 31a, 31b, 31c, and 31d are fixed. The upper portion 31h of the ski support frame 31 further protrudes upward from the upper edge of the side panel 31g. The upper portion 31h is, for example, a plate-like portion extending further upward from the side panel 31g, and is formed integrally with the side panel 31g. The suspension connecting portion 31f is fixed to the upper portion 31h. The structure of the ski support frame 31 is not limited to the example of snowmobile 1. For example, the upper portion 31h may not be formed integrally with the side panel 31g. In this case, the upper portion 31h may be welded or bolted to the side panel 31g.

As shown in FIG. 4, the ski support frame 31 includes two upper portions 31h that are located away from each other in the vehicle width direction (lateral direction). The left and right suspensions 45 are respectively connected to the upper portions 31h. A rod 31i extends in the vehicle width direction and is fixed to the upper portions 31h. This rod 31i improves the rigidity of the ski support frame 31 against the force acting on the ski support frame 31 from the suspensions 45.

As described above, the upper end 45b of the suspension 45 is positioned higher than the rotational center C2 of the secondary shaft 13. In the example of snowmobile 1, the upper end 45b of the suspension 45 is located higher than the upper end of the driven pulley 12b mounted on the secondary shaft 13. The upper end 45b of the suspension 45 is located higher than the lower end 9a (see FIG. 1) of the fuel tank 9. Further, the upper end 45b of the suspension 45 is positioned higher than the lower end 8a (see FIG. 1) of the seat 8.

As shown in FIG. 4, the snowmobile 1 includes a tie rod 24 for steering the skis 41R and 41L. The tie rod 24 is indirectly or directly connected to the lower end of the steering column 22. The tie rod 24 extends in the vehicle width direction and includes tip ends 24a (see FIG. 2A) connected to the knuckles 44. The rotation of the steering handle 21 and the steering column 22 is transmitted to the knuckle 44 through the tie rod 24. The tie rod 24 is located higher than the lower arm 43, and the tip end 24a of the tie rod 24 is located higher than the rotational center C1 of the crank shaft 11a (see FIG. 2B).

As shown in FIG. 2A, the knuckle 44 includes a front post portion 44a and a rear post portion 44b. The upper end of the front post portion 44a and the upper end of the rear post portion 44b are connected to each other. The lower end of the front post portion 44a and the lower end of the rear post portion 44b are also connected to each other. Across bar 44d extends between and is fixed to a midway portion of the front post portion 44a and a midway portion of the rear post portion 44b. The distal end 43p of the lower arm 43 is located above and connected to the cross bar 44d. The structure of the knuckle 44 is not limited to the example shown in FIG. 2A. For example, the knuckle 44 may further include another cross bar located below the cross bar 44d and fixed to the front post portion 44a and the rear post portion 44b. The tip end of the tie rod 24 is connected to the rear post portion 44b.

The present invention is not limited to the snowmobile 1 explained above, and various modifications may be made. In the example of snowmobile 1, the proximal portions 43a and 43b of the lower arm 43 are located higher than the rotational center C1 of the crank shaft 11. However, the proximal portions 43a and 43b of the lower arm 43 can be located lower the rotational center C1 of the crank shaft 11.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A snowmobile comprising:
   a vehicle frame,
      wherein the vehicle frame comprises a ski support frame in a front portion of the vehicle frame;
   a ski disposed outwardly in a vehicle width direction from the ski support frame;
   a knuckle with a lower end having the ski connected thereto;
   an upper arm with a proximal portion connected to the ski support frame, the upper arm extending outwardly in the vehicle width direction from the proximal portion to connect to the knuckle, the proximal portion being rotatable so that the ski and the knuckle can move up and down relative to the ski support frame;
   a lower arm disposed below the upper arm with a proximal portion connected to the ski support frame, and extending outwardly in the vehicle width direction from the proximal portion to connect to the knuckle, the proximal portion being rotatable so that the ski and the knuckle can move up and down relative to the ski support frame; and
   a drive system,
      wherein the drive system comprises an engine and a secondary shaft, the engine being disposed rearward of the ski support frame and comprising a crank shaft, the secondary shaft being located higher than the crank shaft and configured to receive a drive force from the crank shaft, wherein
   the proximal portion of the upper arm has a rotational center and an axis passing through the rotational center, and
   wherein the axis goes through a position of a rotational center of the secondary shaft in a side view of a vehicle body, or through a position above the rotational center of the secondary shaft in the side view of the vehicle body.

2. The snowmobile according to claim 1, wherein
   at least a portion of the proximal portion of the upper arm is positioned higher than the rotational center of the secondary shaft.

3. The snowmobile according to claim 1, wherein
   each of the upper arm and the lower arm comprises a distal end connected to the knuckle, and
   wherein an intersection point, at which the axis passing through the rotational center of the proximal portion of the upper arm crosses an imaginary plane, is located higher than the rotational center of the secondary shaft, where the imaginary plane is a plane that passes through the distal ends of the lower arm and the upper arm and is parallel to the vehicle width direction.

4. The snowmobile according to claim 1, wherein
   the upper arm comprises a distal end connected to the knuckle, and
   the height from a lower end of the ski to the distal end of the upper arm is greater than the height from the lower end of the ski to the rotational center of the secondary shaft.

5. The snowmobile according to claim 1, wherein
   the knuckle comprises a first connecting portion having the upper arm connected thereto and a second connecting portion having the lower arm connected thereto, and
   the second connecting portion is located at substantially the same height as a middle position between the first connecting portion and the lower end of the knuckle or located lower than the middle position.

6. The snowmobile according to claim 1, wherein
   the proximal portion of the lower arm is located higher than a rotational center of the crank shaft of the engine.

7. The snowmobile according to claim 1, further comprising a suspension with an upper end connected to the ski support frame and a lower end connected to the lower arm, wherein
   the upper end of the suspension is located higher than the rotational center of the secondary shaft.

8. The snowmobile according to claim 1, wherein
   the vehicle frame comprises an engine support frame supporting the engine, and
   the ski support frame is shifted upward relative to the engine support frame.

* * * * *